(No Model.)
E. J. FORREST.
KNOB.
No. 472,805. Patented Apr. 12, 1892.
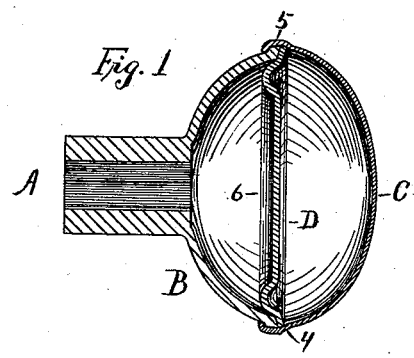
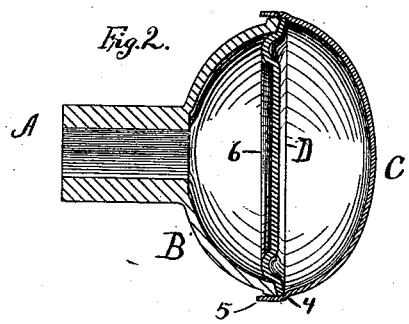
Witnesses.
Arthur G. Beach.
John Edwards Jr.
Inventor.
Ernest J. Forrest.
By James Shepard.
Atty.

UNITED STATES PATENT OFFICE.

EARNEST J. FORREST, OF NEW BRITAIN, CONNECTICUT, ASSIGNOR TO THE RUSSELL & ERWIN MANUFACTURING COMPANY, OF SAME PLACE.

KNOB.

SPECIFICATION forming part of Letters Patent No. 472,805, dated April 12, 1892.

Application filed December 19, 1891. Serial No. 415,626. (No model.)

*To all whom it may concern:*

Be it known that I, EARNEST J. FORREST, a citizen of the United States, residing at New Britain, in the county of Hartford and State of Connecticut, have invented certain new and useful Improvements in Door-Knobs, of which the following is a specification.

My invention relates to improvements in door-knobs of the class which are formed of two hollow shells; and the object of my improvement is to enable the meeting edges of these parts to be more securely and conveniently attached.

In the accompanying drawings, Figure 1 is a sectional view of my knob. Fig. 2 is a like view with the parts placed in position for being secured together.

I prefer to form the knob-shank A and contiguous half B of the knob-shell of cast metal in substantially the form shown; but my invention is applicable to a knob in which the part B of the shell is formed of sheet metal.

The part C of the knob-shell is preferably struck up from sheet metal with a shoulder or offset 4 at the base of its flange or lip 5, the lip being first left open, as shown in Fig. 2, to receive the rim of the part B. It is old to make a knob-shell of two such parts by forming them in this manner, placing them together, and spinning down the lip or flange upon the rim of the part B. In addition to said two parts I employ a disk D, either flat, as shown in Fig. 3, or provided with an annular bead 6 near its outer edge of a size in its complete circle to substantially fill the interior at the mouth of the part B, as shown in Figs. 1 and 2. In both cases the disk rests upon the offset or shoulder 4 of the part C on one side, while its opposite side rests upon the edge of the part B, the edge of the disk meantime being within the flange or lip 5 near the shoulder 4 of the part C. After placing the parts together, as shown in Fig. 2, the flange or lip 5 is firmly turned down and presses upon the outside of the rim of the part B of the shell, as shown in Figs. 1 and 3, this turning down of the flange or lip being preferably done by spinning. In thus turning down the lip there is a tendency to crush in or contract the rim of the part B, so as to somewhat reduce its diameter. The bead 6 furnishes an internal support to prevent this part from being so crushed in, while the disk which cannot be materially reduced in diameter in spinning, will prevent the part B from farther entering the part C, even if the diameter of the part B shall be somewhat reduced. It is evident that if the part B in the process of spinning is pressed farther into the part C its rim would slightly move away from the lip or flange pressed down upon it, so that the two parts would not be firmly secured. By the employment of the beaded disk I am enabled to hold both parts of the shell firmly in place, so that they are solidly secured together.

I claim as my invention—

A knob-shell consisting of two parts, one of which is provided with an overlapping flange or lip and an internal supporting-disk of a diameter to fill the part provided with said overlapping flange and having an annular bead near its edge of a size in its complete circle to substantially fill the inside of that part of the shell over which said lip is turned down, substantially as described, and for the purpose specified.

EARNEST J. FORREST.

Witnesses:
   THOS. S. BISHOP,
   CHAS. M. BURGESS.